United States Patent
Chao et al.

(10) Patent No.: US 6,983,084 B2
(45) Date of Patent: Jan. 3, 2006

(54) METHOD OF ALIGNING PAGE IMAGES

(75) Inventors: Hui Chao, San Jose, CA (US); Dan S. Bloomberg, Palo Alto, CA (US)

(73) Assignee: Hewlett-Packard Development Company, LP., Houston, TX (US)

( * ) Notice: Subject to any disclaimer, the term of this patent is extended or adjusted under 35 U.S.C. 154(b) by 668 days.

(21) Appl. No.: 10/231,415

(22) Filed: Aug. 28, 2002

(65) Prior Publication Data
US 2003/0215157 A1 Nov. 20, 2003

Related U.S. Application Data

(63) Continuation-in-part of application No. 10/150,362, filed on May 17, 2002.

(51) Int. Cl.
*G06K 9/32* (2006.01)
(52) U.S. Cl. ........................... 382/294; 382/278
(58) Field of Classification Search ............... 382/294, 382/278, 282, 289, 290, 174, 257, 308, 264
See application file for complete search history.

(56) References Cited

U.S. PATENT DOCUMENTS

| | | | |
|---|---|---|---|
| 5,832,110 A | * | 11/1998 | Hull ........................... 382/294 |
| 6,081,621 A | * | 6/2000 | Ackner ....................... 382/216 |
| 6,285,802 B1 | * | 9/2001 | Dennis et al. .............. 382/290 |

* cited by examiner

*Primary Examiner*—Phuoc Tran

(57) ABSTRACT

A method of aligning a first page image and a second page image is disclosed. The first page image and the second page image are deskewed. Then, the first page image and the second page image are vertically aligned. In particular, a first vertical data set comprising a plurality of first values each first value based on a horizontal scanline of the first page image is generated. Moreover, a second vertical data set comprising a plurality of second values each second value based on a horizontal scanline of the second page image is generated. One of the first and second vertical data sets is dilated. Then, the first and second vertical data sets are cross-correlated to generate cross-correlation data. A maximum value of the cross-correlation data is determined, whereas the maximum value indicates vertical alignment between the first and second page images. Finally, the first and second page images are horizontally aligned.

29 Claims, 6 Drawing Sheets

METHOD OF ALIGNING PAGE IMAGES

CROSS REFERENCE TO RELATED APPLICATION

This patent application is a Continuation-in-Part of co-pending, commonly-owned U.S. patent application Ser. No. 10/150,362, filed on May 17, 2002, entitled "METHOD AND SYSTEM FOR DOCUMENT SEGMENTATION", by Chao et al., which is incorporated herein by reference.

BACKGROUND OF THE INVENTION

1. Field of the Invention

Embodiments of the present invention generally relate to image processing. More particularly, embodiments of the present invention relate to aligning page images.

2. Related Art

Information automation has enabled increased productivity by converting paper-based pages to an electronic page image format. This allows automated page delivery, page sorting, page preservation, and other applications. Image processing facilitates this information automation.

Once a paper-based page is scanned to generate the page image, a number of processes can be performed on the page image. Rather than having encoded information such that characters and words are a sequence of digital bits, the page image is comprised of a plurality of pixels. Hence, search and identification of page images is more complex.

To facilitate search and identification of page images, a bar code is sometimes included in the paper-based page. However, this technique can be costly and inconvenient. Others have included unique characteristic features to the paper-based page to facilitate search and identification of page images. Again, this scheme can be inconvenient and limited to a few applications.

Typically, comparison techniques are utilized to identify page images. One method of comparing page images is cross-correlation, which is usually performed by first two-dimensionally Fourier transforming the page images to be compared. Then, the pixels are multiplied point by point. Finally, the page images are inversely transformed back into a spatial representation to show correlation peaks.

To improve the results of any comparison technique, the page images to be compared are aligned first. A Fourier method or a simple image cross-correlation is usually used to align the page images. However, this can be computationally intensive and time consuming.

Therefore, the typical prior art alignment schemes are all problematic and suffer different drawbacks.

SUMMARY OF THE INVENTION

A method of aligning a first page image and a second page image is disclosed. The first page image and the second page image are deskewed. Then, the first page image and the second page image are vertically aligned. In particular, a first vertical data set comprising a plurality of first values each first value based on a horizontal scanline of the first page image is generated. Moreover, a second vertical data set comprising a plurality of second values each second value based on a horizontal scanline of the second page image is generated. One of the first and second vertical data sets is dilated. Then, the first and second vertical data sets are cross-correlated to generate cross-correlation data. A maximum value of the cross-correlation data is determined, whereas the maximum value indicates vertical alignment between the first and second page images. Finally, the first and second page images are horizontally aligned.

BRIEF DESCRIPTION OF THE DRAWINGS

The accompanying drawings, which are incorporated in and form a part of this specification, illustrate embodiments of the invention and, together with the description, serve to explain the principles of the present invention.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention.

In general, page images are aligned using a method of aligning page images. Initially, the page images are deskewed. Then, the page images are vertically aligned using first data that is based on horizontal scanlines of the page images. Moreover, the page images are horizontally aligned using second data that is based on vertical scanlines of the page images.

Figure 1:
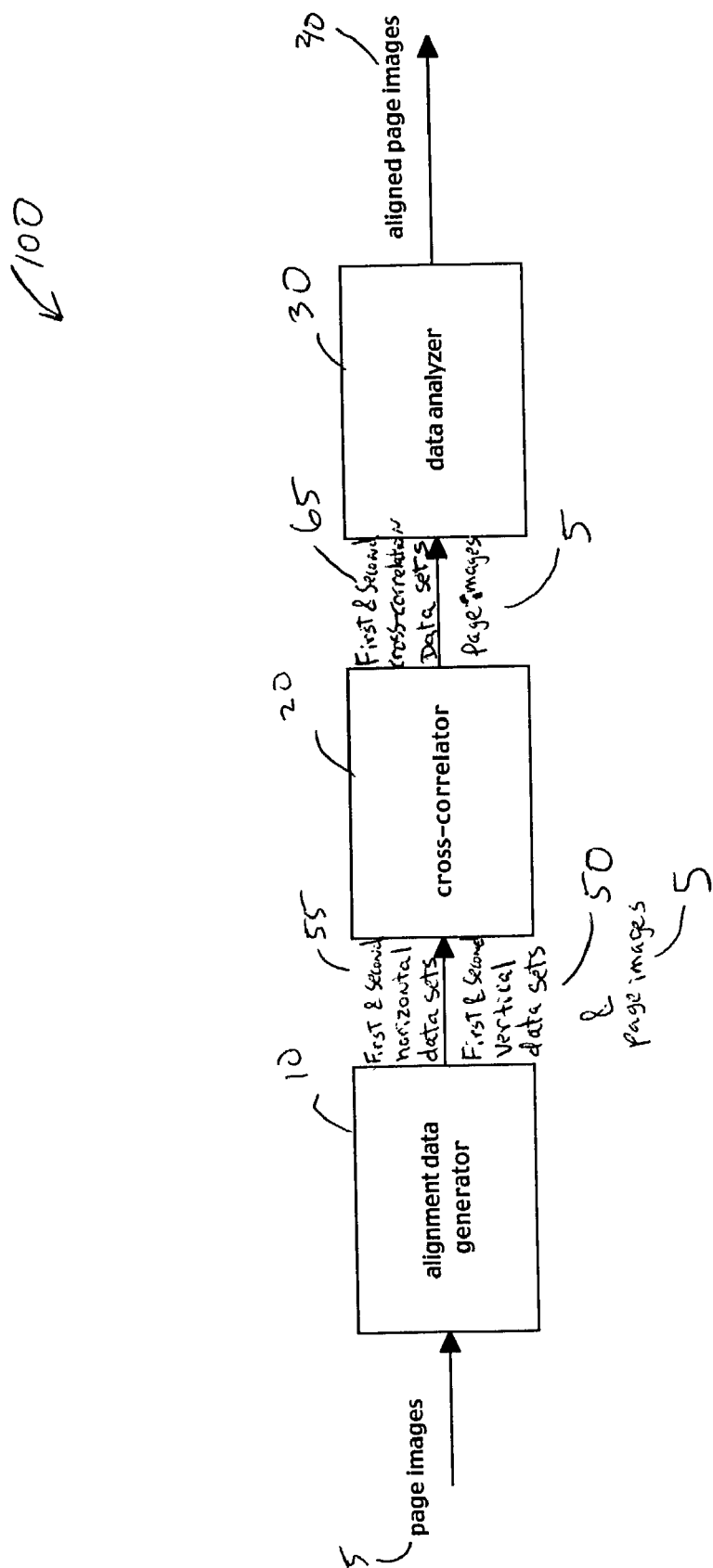
FIG. 1 illustrates a system for aligning page images in accordance with an embodiment of the present invention.

FIG. 1 illustrates a system 100 for aligning page images in accordance with an embodiment of the present invention. The system 100 includes an alignment data generator 10, a cross-correlator 20, and a data analyzer 30. The system 100 can be implemented in hardware, software, or a combination thereof. It should be understood that the system 100 can have other configurations.

In practice, a first page image and at least a second page image (collectively referred as page images 5) are provided to the alignment data generator 10. These image pages may be consecutive or nonconsecutive. In an embodiment, a first page image and a second page image are received by the alignment data generator 10. The page images 5 are scanned from paper-based pages and are comprised of a plurality of pixels. The page images 5 include a plurality of printed text lines. Moreover, the page images 5 may include graphics and handwritten text.

The alignment data generator 10 can generate skew data (e.g., skew angle) for each of the page images 5 and use the skew data to separately deskew (or rotate) each of the page images 5. The skew angle is the angle at which a line of the page image differs from a preselected reference line, such as a horizontal line. A single skew angle can be determined for each page image 5. Alternatively, a skew angle can be determined on a per-line basis for each page image 5. Various methods exist for determining the skew angle. In some deskewing techniques, printed text lines are detected in each page image 5. Then, a skew angle for each printed text line or the whole page image is determined. Each page image 5 is rotated based on the skew angle to deskew the page image 5.

Moreover, the alignment data generator 10 generates a plurality of first data sets based on the first page image and generates at least a plurality of second data sets based on at least a second page image. In an embodiment, the plurality of first data sets comprises a first vertical data set 50 comprising a plurality of first values each first value based on a horizontal scanline of the first page image and a first horizontal data set 55 comprising a plurality of first horizontal values each first horizontal value based on a vertical scanline of a first printed text line of the first page image.

In an embodiment, the plurality of second data sets comprises a second vertical data set 50 comprising a plurality of second values each second value based on a horizontal scanline of the second page image and a second horizontal data set 55 comprising a plurality of second horizontal values each second horizontal value based on a vertical scanline of a corresponding printed text line of the second page image. It should be understood that each additional sets of data corresponding to page images in addition to the second page image comprise another vertical data set and another horizontal data set, each based on each additional page image.

The first vertical data set 50 and the second vertical data set 50 can be one of a horizontal projection profile, a differential horizontal projection profile, and a plurality of binary values indicating whether a particular horizontal scanline represents a portion of a printed text line. The horizontal projection profile is an array giving the number of "ON" or active pixels in each horizontal scanline. In general, pixels are defined to be "ON" if they are black (representing the foreground) and "OFF" if they are white (representing the background). Typically, the horizontal projection profile will have larger values within printed text lines. The differential horizontal projection profile is an array giving the absolute value of the differential between "ON" or active pixels in adjacent or nearly adjacent horizontal scanlines.

The first horizontal data set 55 and the second horizontal data set 55 can be one of a vertical projection profile and a differential vertical projection profile. The vertical projection profile is an array giving the number of "ON" or active pixels in each vertical scanline. In general, pixels are defined to be "ON" if they are black (representing the foreground) and "OFF" if they are white (representing the background). The differential vertical projection profile is an array giving the absolute value of the differential between "ON" or active pixels in adjacent or nearly adjacent vertical scanlines.

Continuing with FIG. 1, the alignment data generator 10 dilates one of the first and second vertical data sets 50 prior to providing it to the cross-correlator 20. The term "dilate" refers to an operation performed on a data set of values so that transitions between values are made smoother. This is useful before cross-correlating several data sets to minimize the influence of certain variations in the data sets on the cross-correlation operation.

The cross-correlator 20 cross-correlates the first and second vertical data sets to generate first cross-correlation data set 65. The alignment data generator 10 optionally dilates one of the first and second horizontal data sets prior to providing it to the cross-correlator 20. Moreover, the cross-correlator 20 cross-correlates the first and second horizontal data sets to generate second cross-correlation data set 65.

The data analyzer 30 determines a maximum value of the first cross-correlation data set 65, whereas the maximum value indicates vertical alignment between the first and second page images. Moreover, the data analyzer 30 determines a maximum value of the second cross-correlation data set 65, whereas the maximum value indicates horizontal alignment between the first and second page images. The data analyzer 30 uses the page images 5 and the maximum values of the cross-correlation data sets 65 to generate the aligned page images 40. Hence, the aligned page images 40 can be outputted from the data analyzer 30 based on the determined maximum values which control the vertical displacement and horizontal displacement required to align the page images 5.

Figure 2:
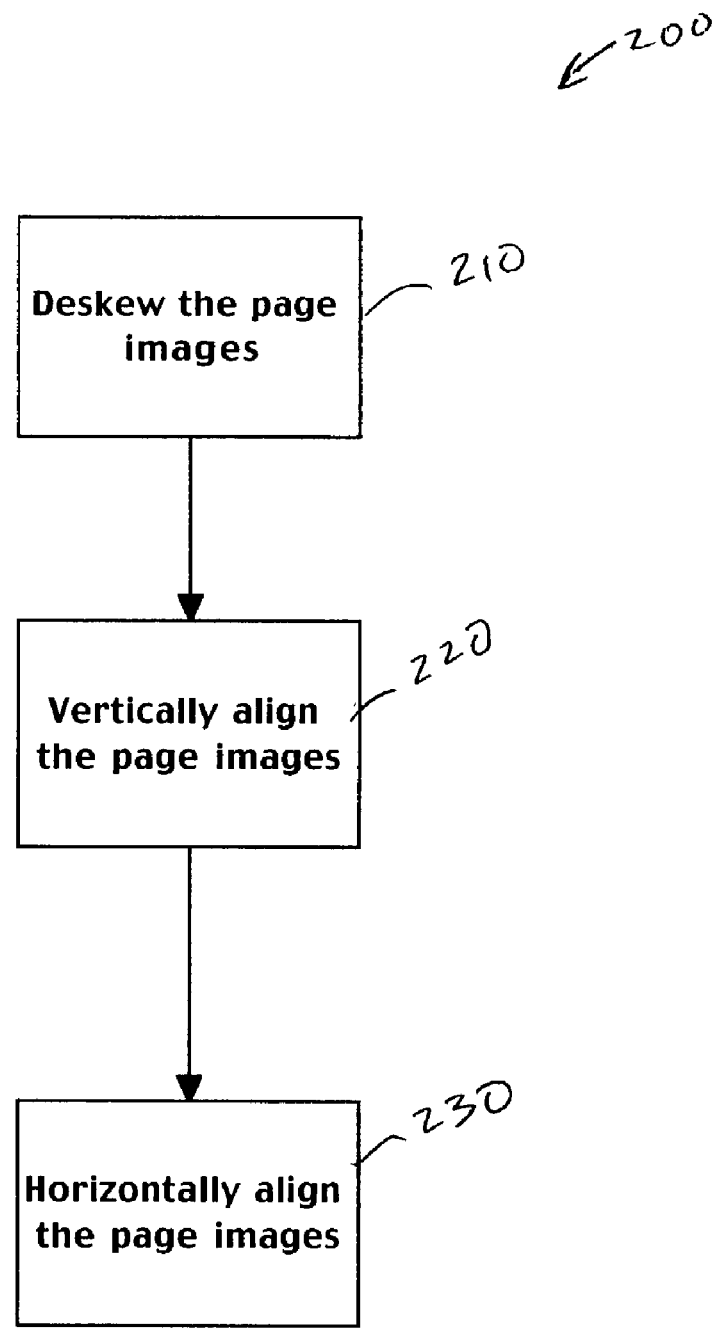
FIG. 2 illustrates a flow chart showing a method of aligning page images in accordance with an embodiment of the present invention.

FIG. 2 illustrates a flow chart showing a method 200 of aligning page images in accordance with an embodiment of the present invention. At Block 210, the page images are deskewed. In an embodiment, a first page image and at least a second page image are deskewed. Any technique for deskewing can be used.

Figure 3:
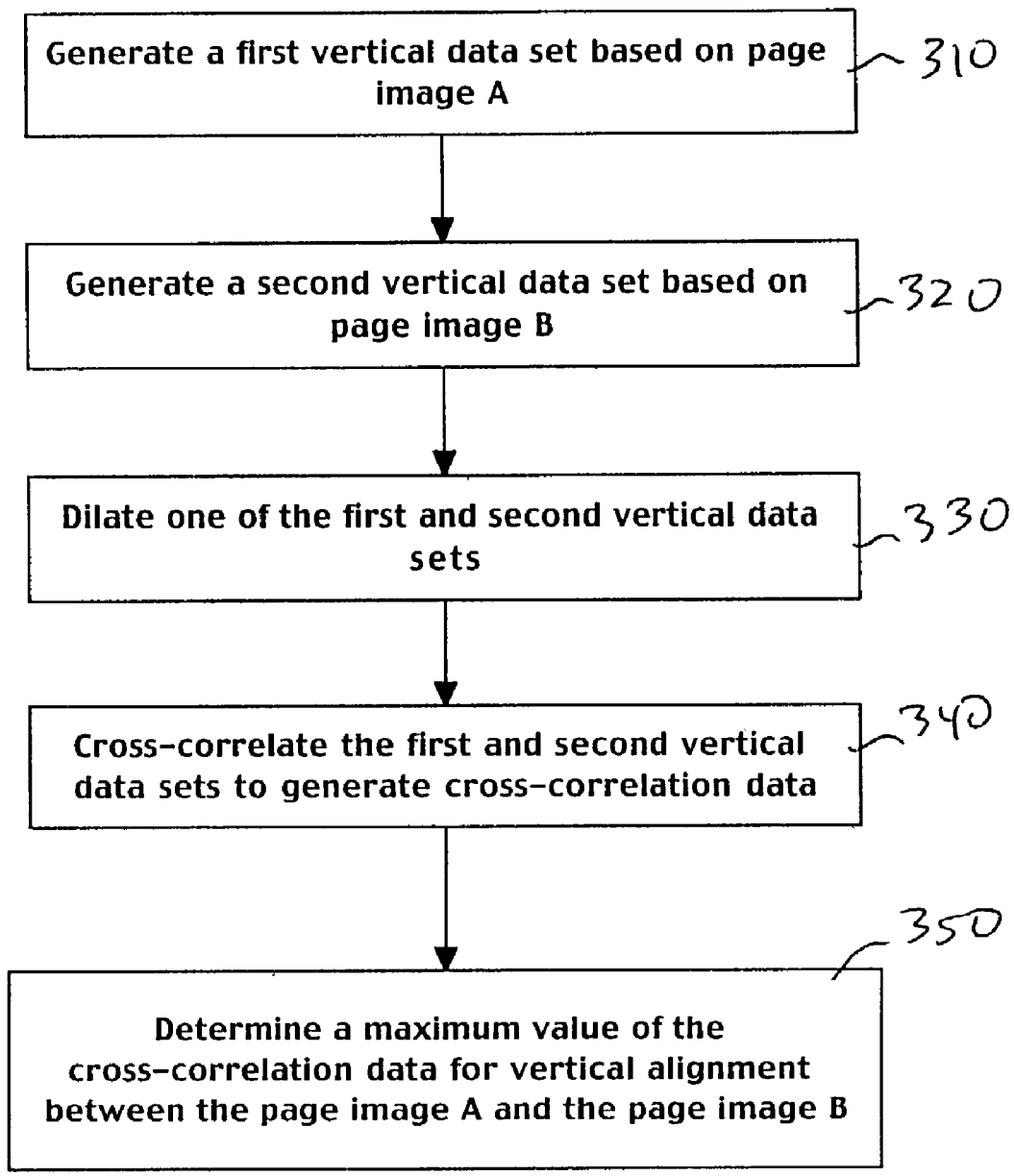
FIG. 3 illustrates a flow chart showing a method of vertically aligning page images in accordance with an embodiment of the present invention.
Figure 4:
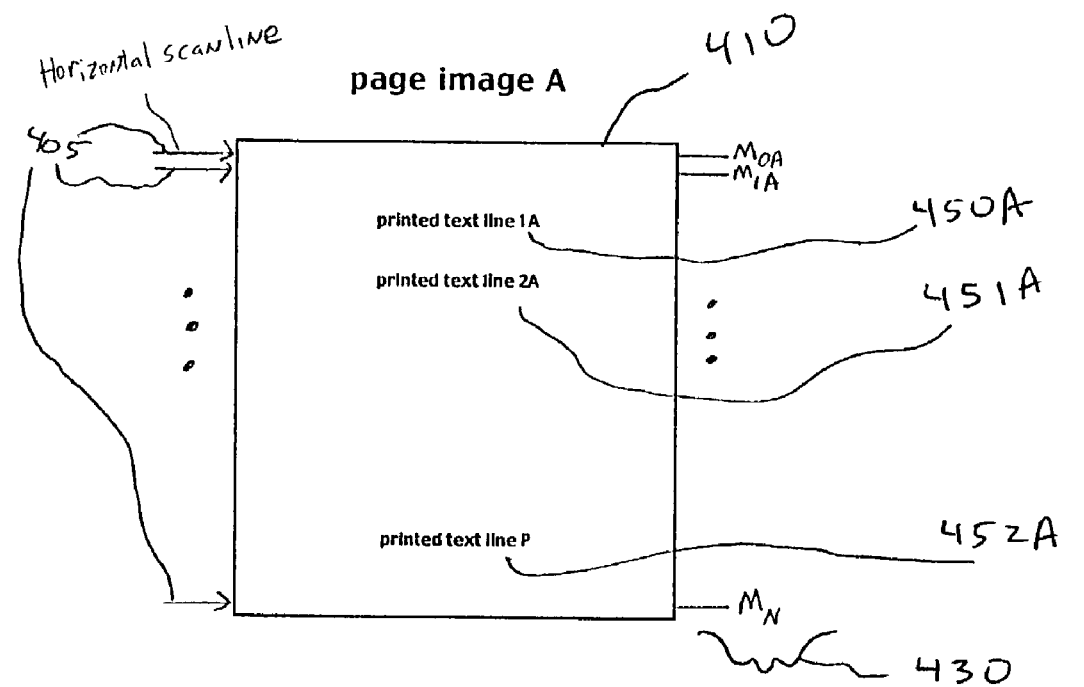
FIG. 4 illustrates a plurality of page images to be vertically aligned in accordance with an embodiment of the present invention.
Figure 4:
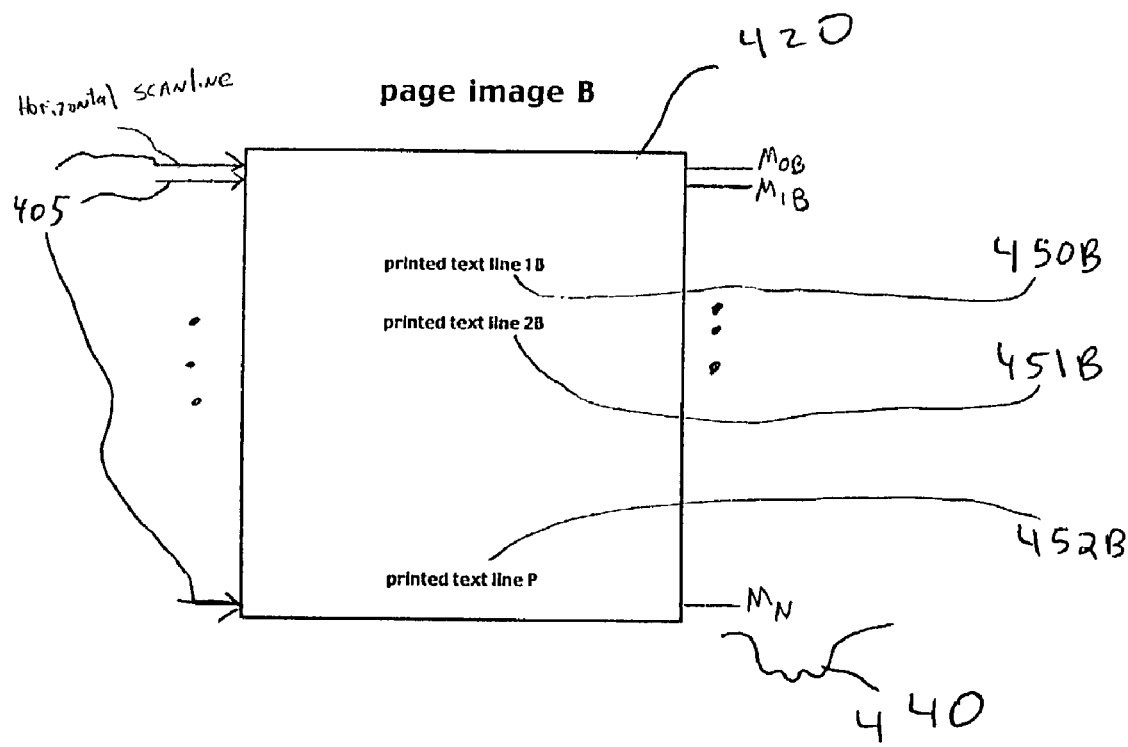

At Block 220, the first page image and at least a second page image are vertically aligned using first data that is based on horizontal scanlines of the first and second page images. FIGS. 3–4 provide a detail description of Block 220.

Figure 5:
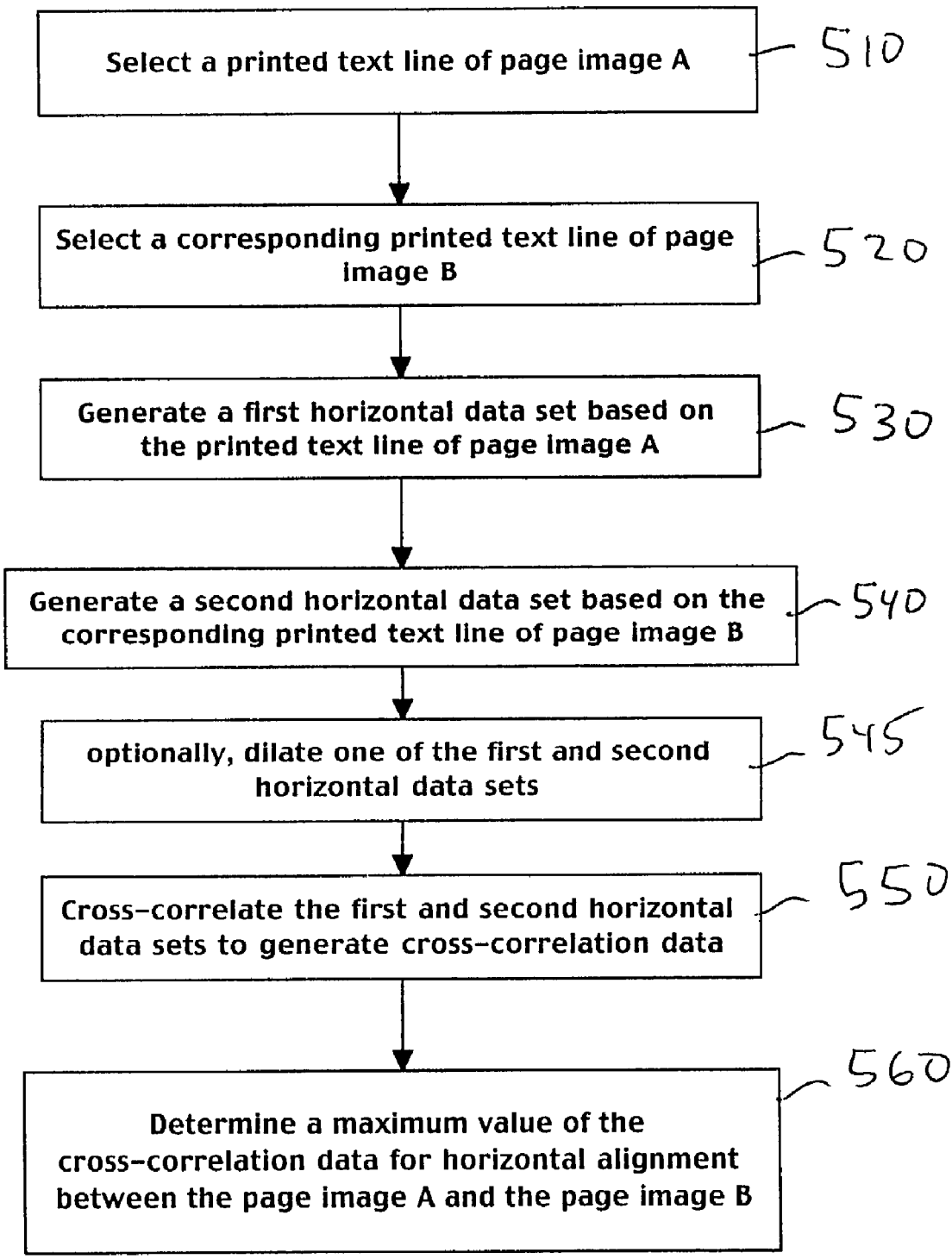
FIG. 5 illustrates a flow chart showing a method of horizontally aligning page images in accordance with an embodiment of the present invention.
Figure 6:
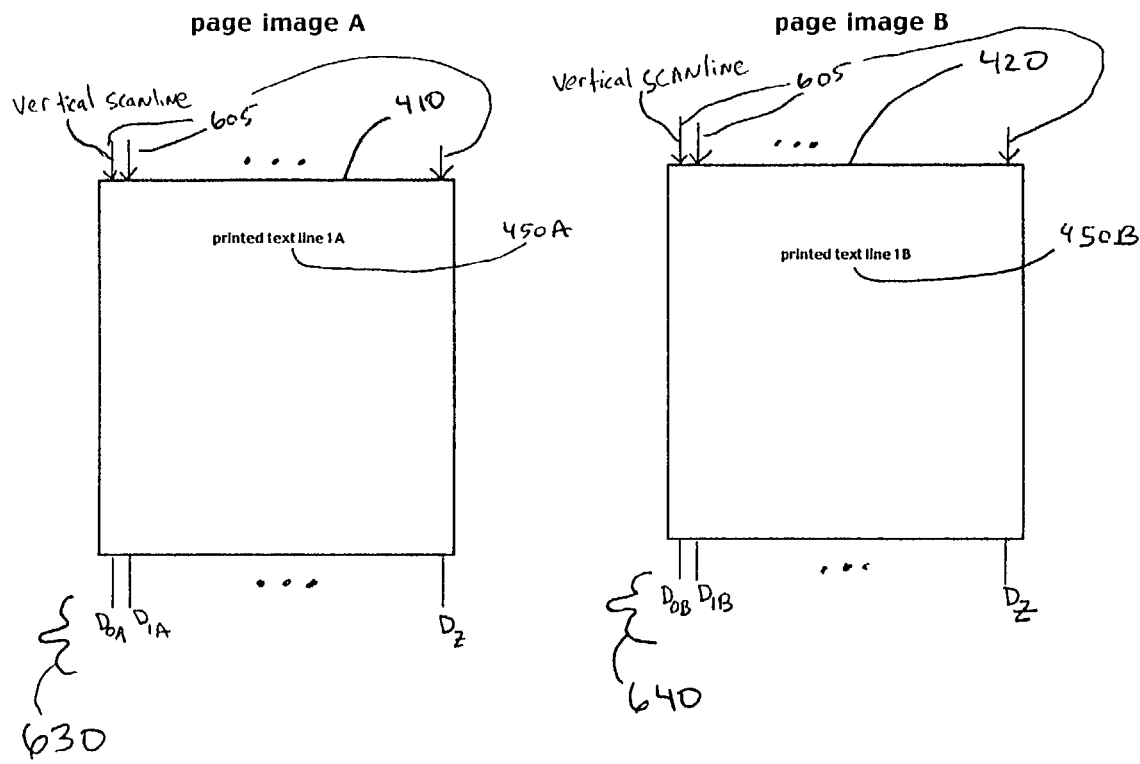
FIG. 6 illustrates a plurality of page images to be horizontally aligned in accordance with an embodiment of the present invention.

Moreover, at Block 230, the first page image and at least a second page image are horizontally aligned using second data that is based on vertical scanlines of the first and second page images. FIGS. 5–6 provide a detail description of Block 230.

As illustrated in FIG. 2, the method 200 of aligning page images can be efficiently implemented because it allows a sequencing of independent alignment tasks: rotation (deskew), vertical displacement, and horizontal displacement. Without such sequencing, the search space for alignment is very large. Moreover, the method 200 of aligning page images allows fast alignment of two page images.

FIG. 3 illustrates a flow chart showing a method 300 of vertically aligning page images in accordance with an embodiment of the present invention. Reference is made to FIG. 4, which illustrates a plurality of page images (e.g., page image A 410 and page image B 420) to be vertically aligned in accordance with an embodiment of the present invention. Moreover, FIGS. 3–4 provide a detail description of Block 220 of FIG. 2.

At Block 310, a first vertical data set 430 (FIG. 4) comprising a plurality of first values ($M_{0A}$, $M_{1A}$, ... $M_N$) each first value based on a horizontal scanline 405 (FIG. 4) of the page image A 410 (FIG. 4) is generated. Moreover, at Block 320, a second vertical data set 440 (FIG. 4) comprising a plurality of second values ($M_{0B}$, $M_{1B}$, ... $M_N$) each second value based on a horizontal scanline 405 (FIG. 4) of the page image B 420 (FIG. 4) is generated.

The first vertical data set 430 and the second vertical data set 440 can be one of a horizontal projection profile, a differential horizontal projection profile, and a plurality of binary values (e.g., "0" and "1") indicating whether a particular horizontal scanline 405 represents a portion of a printed text line (e.g., 450A–452A and 450B–452B).

The binary values "0" is used to indicate that a particular horizontal scanline 405 does not represent a portion of a printed text line (e.g., 450A–452A and 450B–452B). The binary values "1" is used to indicate that a particular horizontal scanline 405 represents a portion of a printed text line (e.g., 450A–452A and 450B–452B). As described above, several deskewing techniques detect the printed text line of a page image.

The horizontal projection profile is an array giving the number of "ON" or active pixels in each horizontal scanline 405. In general, pixels are defined to be "ON" if they are black (representing the foreground) and "OFF" if they are white (representing the background). Typically, the horizontal projection profile will have larger values within printed text lines 450A–452A and 450B–452B. The differential horizontal projection profile is an array giving the absolute value of the differential between "ON" or active pixels in adjacent or nearly adjacent horizontal scanlines 405.

Continuing at Block 330, one of the first and second vertical data sets 430 and 440 is dilated. This provides robustness to the present alignment technique even if the page image A 410 and page image B 420 have been scaled differently (e.g., due to copying of the paper-based page) prior to performing the present alignment technique. The page images 410 and 420 may be scaled differently because one is enlarged in size while the other is reduced in size. For example, the original paper-based page corresponding to page image 410 could be copied. Additional copies could be made of these copies of the original paper-based page, whereas the process of copying changes the scale of the paper-based page with respect to the original paper-based page. Scaling can occur with respect to fonts, line spacing, and general formatting of text. In one embodiment, the page images 410 and 420 are scaled the same. The dilation can be a morphological dilation. Alternatively, the dilation can be a convolution using a low-pass filter.

Moreover, at Block 340, the first and second vertical data sets 430 and 440, one of which has been dilated, are cross-correlated to generate cross-correlation data set. For example, the values of the cross-correlation data set can be computed by summing the cross products between the data sets 430 and 440 at different lags. Use of lags in cross-correlation techniques is well known in the field of statistical analysis and is beyond the scope of the present invention. Furthermore, at Block 350, a maximum value of the cross-correlation data set is determined, whereas the maximum value indicates vertical alignment between the page image A 410 and the page image B 420. The maximum value can be compared to a threshold value which provides an indication of whether the page image A and the page image B have some common printed text lines. A vertical displacement based on the maximum value vertically aligns the page images. For instance, either one of page image A and page image B is vertically displaced with respect to the other of page images A and B based on the determined maximum value to vertically align the page images A and B.

FIG. 5 illustrates a flow chart showing a method 500 of horizontally aligning page images in accordance with an embodiment of the present invention. Reference is made to FIG. 6, which illustrates a plurality of page images (e.g., page image A 410 and page image B 420) to be horizontally aligned in accordance with an embodiment of the present invention. Moreover, FIGS. 5–6 provide a detailed description of Block 230 of FIG. 2.

At Block 510, a portion of page image A 410 (FIG. 4) which comprises one or multiple printed text lines such as 450A, 451A, and 452A, is selected. Any number of the printed text lines 450A, 451A, and 452A can be selected. For example, the printed text line 450A can be selected. Alternatively, the printed text lines 450A and 451A can be selected. Moreover, at Block 520, a corresponding portion of page image B 420 (FIG. 4) which comprises one or multiple corresponding printed text lines, such as 450B, 451B, and 452B, is selected. For example, if the printed text line 450A of page image A 410 is selected, then the corresponding printed text line 450B of page image B 420 is selected. Similarly, if the printed text lines 450A and 451A of page image A 410 are selected, then the corresponding printed text lines 450B and 451B of page image B 420 are selected.

As illustrated in FIG. 6, the printed text line 450A of page image A 410 is selected. Moreover, the corresponding printed text line 450B of page image B 420 is selected, as well.

Continuing at Block 530 (FIG. 5), a first horizontal data set 630 (FIG. 6) comprising a plurality of first horizontal values ($D_{0A}$, $D_{1A}$ . . . $D_Z$) each first horizontal value based on a vertical scanline 605 (FIG. 6) of the selected printed text line 450A (FIG. 6) of the page image A 410 (FIG. 6) is generated. Similarly, at Block 540, a second horizontal data set 640 (FIG. 6) comprising a plurality of second horizontal values ($D_{0B}$, $D_{1B}$, . . . $D_Z$) each second horizontal value based on a vertical scanline 605 (FIG. 6) of the corresponding printed text line 450B (FIG. 6) of the page image B 420 (FIG. 6) is generated.

The first horizontal data set 630 and the second horizontal data set 640 can be one of a vertical projection profile and a differential vertical projection profile.

The vertical projection profile is an array giving the number of "ON" or active pixels in each vertical scanline 605. In general, pixels are defined to be "ON" if they are black (representing the foreground) and "OFF" if they are white (representing the background). The differential vertical projection profile is an array giving the absolute value of the differential between "ON" or active pixels in adjacent or nearly adjacent vertical scanlines 605.

Optionally, at Block 545, one of the first and second horizontal data sets 630 and 640 is dilated. As described previously, this provides robustness to the present alignment technique even if the page image A 410 and page image B 420 have been scaled differently. In one embodiment, the page images 410 and 420 are scaled the same. The dilation can be a morphological dilation. Alternatively, the dilation can be a convolution using a low-pass filter.

Moreover, at Block 550, the first and second horizontal data sets 630 and 640 are cross-correlated to generate second cross-correlation data set. For example, the values of the cross-correlation data set can be computed by summing the cross products between the data sets 630 and 640 at different lags. Use of different lags in computation of cross-correlation data is well known in the field and will not be discussed further since it is outside the scope of the invention. Furthermore, at Block 560, a maximum data of the second cross-correlation data set is determined, whereas the maximum data indicates horizontal alignment between the page image A 410 and the page image B 420. The maximum data can be compared to a threshold value which provides an indication of whether the page image A and the page image B have some common printed text lines. A horizontal displacement based on the maximum data horizontally aligns the page images. For instance, either one of page image A and page image B is horizontally displaced with respect to the other of page images A and B based on the determined maximum data to horizontally align the page images A and B.

In one exemplary application of the present alignment technique, a teacher uses a computer to create a homework assignment, whereas the homework assignment has designated areas in which to place an answer. The teacher prints the homework assignment and distributes the paper-based homework assignment to the students. After completing the paper-based homework assignment by placing answers in the designated areas, the students submit the paper-based homework assignment to the teacher. The teacher scans an original paper-based homework assignment having the correct answers in the designated areas to create an original homework assignment image and scans each paper-based homework assignment to create homework assignment images. The present alignment technique can be used to align each homework assignment image with the original homework assignment image so that the designated areas of the homework assignment image can be properly compared with the designated areas of the original homework assignment image, enabling grading of the homework assignments.

In yet another exemplary application of the present alignment technique, a company scans paper-based forms that are completed and submitted by clients, vendors, or others to create form images. Additionally, the company scans the original paper-based forms to create original form images. The present alignment technique can be used to align the form images with the original form images so that the form images can be compared with the original form images to identify data fields within the form images, thereby enabling sorting and further processing of the form images.

In an embodiment, the present invention is configured as computer-executable instructions stored in a computer-readable medium, such as a magnetic disk, CD-ROM, an optical medium, a floppy disk, a flexible disk, a hard disk, a magnetic tape, a RAM, a ROM, a PROM, an EPROM, a flash-EPROM, or any other medium from which a computer can read.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of aligning a first page image and a second page image, comprising:
   deskewing said first page image and said second page image;
   vertically aligning said first and second page images, said vertically aligning comprising:
      generating a first vertical data set comprising a plurality of first values each first value based on a horizontal scanline of said first page image and generating a second vertical data set comprising a plurality of second values each second value based on a horizontal scanline of said second page image;
      dilating one of said first and second vertical data sets;
      cross-correlating said dilated one and other one of said first and second vertical data sets to generate cross-correlation data; and
      determining a maximum value of said cross-correlation data, said maximum value indicating vertical alignment between said first and second page images; and
   horizontally aligning said first and second page images.

2. A method as recited in claim 1 wherein said horizontally aligning comprises:
   selecting a printed text line of said first page image and selecting a corresponding printed text line of said second page image;
   generating a first horizontal data set comprising a plurality of first horizontal values each first horizontal value based on a vertical scanline of said printed text line of said first page image and generating a second horizontal data set comprising a plurality of second horizontal values each second horizontal value based on a vertical scanline of said corresponding printed text line of said second page image;
   cross-correlating said first and second horizontal data sets to generate second cross-correlation data; and
   determining a maximum data of said second cross-correlation data, said maximum data indicating horizontal alignment between said first and second page images.

3. A method as recited in claim 2 further comprising:
   dilating one of said first and second horizontal data sets before performing said cross-correlation of said first and second horizontal data sets.

4. A method as recited in claim 2 wherein said first horizontal data set and said second horizontal data set are each one of a vertical projection profile and a differential vertical projection profile.

5. A method as recited in claim 1 wherein said first vertical data set and said second vertical data set are each one of a horizontal projection profile, a differential horizontal projection profile, and a plurality of binary values indicating whether a particular horizontal scanline represents a portion of a printed text line.

6. A method as recited in claim 1 wherein said dilating comprises morphologically dilating.

7. A method as recited in claim 1 wherein said dilating comprises convolution using a low-pass filter.

8. A method of aligning a first page image and a second page image, comprising:
   deskewing said first page image and said second page image;
   vertically aligning said first and second page images; and
   horizontally aligning said first and second page images, said horizontally aligning comprising:
      selecting a printed text line of said first page image and selecting a corresponding printed text line of said second page image;
      generating a first horizontal data set comprising a plurality of first horizontal values each first horizontal value based on a vertical scanline of said printed text line of said first page image and generating a second horizontal data set comprising a plurality of second horizontal values each second horizontal value based on a vertical scanline of said corresponding printed text line of said second page image;
      cross-correlating said first and second horizontal data sets to generate cross-correlation data; and
      determining a maximum data of said cross-correlation data, said maximum data indicating horizontal alignment between said first and second page images.

9. A method as recited in claim 8 further comprising:
dilating one of said first and second horizontal data sets before performing said cross-correlation of said first and second horizontal data sets.

10. A method as recited in claim 8 wherein said vertically aligning comprises:
generating a first vertical data set comprising a plurality of first values each first value based on a horizontal scanline of said first page image and generating a second vertical data set comprising a plurality of second values each second value based on a horizontal scanline of said second page image;
dilating one of said first and second vertical data sets;
cross-correlating said dilated one and other one of said first and second vertical data sets to generate second cross-correlation data; and
determining a maximum value of said second cross-correlation data, said maximum value indicating vertical alignment between said first and second page images.

11. A method as recited in claim 10 wherein said first vertical data set and said second vertical data set are each one of a horizontal projection profile, a differential horizontal projection profile, and a plurality of binary values indicating whether a particular horizontal scanline represents a portion of a printed text line.

12. A method as recited in claim 8 wherein said first horizontal data set and said second horizontal data set are each one of a vertical projection profile and a differential vertical projection profile.

13. A method as recited in claim 9 wherein said dilating comprises morphologically dilating.

14. A method as recited in claim 9 wherein said dilating comprises convolution using a low-pass filter.

15. A system for aligning a first page image and a second page image, comprising:
an alignment data generator for generating a plurality of first data sets based on said first page image, for generating a plurality of second data sets based on said second page image, and for deskewing said first and second page images;
a cross-correlator for cross-correlating one of said first data sets and one of said second data sets to generate cross-correlation data; and
data analyzer for determining a maximum of said cross-correlation data, wherein said maximum indicates alignment between said first and second page images.

16. A system as recited in claim 15 wherein said plurality of first data sets comprises a first vertical data set comprising a plurality of first values each first value based on a horizontal scanline of said first page image and a first horizontal data set comprising a plurality of first horizontal values each first horizontal value based on a vertical scanline of a printed text line of said first page image.

17. A system as recited in claim 16 wherein said first vertical data set is one of a horizontal projection profile, a differential horizontal projection profile, and a plurality of binary values indicating whether a particular horizontal scanline represents a portion of a printed text line.

18. A system as recited in claim 16 wherein said first horizontal data set is one of a vertical projection profile and a differential vertical projection profile.

19. A system as recited in claim 15 wherein said plurality of second data sets comprises a second vertical data set comprising a plurality of second values each second value based on a horizontal scanline of said second page image and a second horizontal data set comprising a plurality of second horizontal values each second horizontal value based on a vertical scanline of a corresponding printed text line of said second page image.

20. A system as recited in claim 19 wherein said second vertical data set is one of a horizontal projection profile, a differential horizontal projection profile, and a plurality of binary values indicating whether a particular horizontal scanline represents a portion of a printed text line.

21. A system as recited in claim 19 wherein said second horizontal data set is one of a vertical projection profile and a differential vertical projection profile.

22. A system as recited in claim 15 wherein said alignment data generator dilates one of said data sets.

23. A computer-readable medium comprising computer-executable instructions stored therein for performing a method of aligning a first page image and a second page image, comprising:
deskewing said first page image and said second page image;
vertically aligning said first and second page images, said vertically aligning comprising:
generating a first vertical data set comprising a plurality of first values each first value based on a horizontal scanline of said first page image and generating a second vertical data set comprising a plurality of second values each second value based on a horizontal scanline of said second page image;
dilating one of said first and second vertical data sets;
cross-correlating said dilated one and other one of said first and second vertical data sets to generate cross-correlation data; and
determining a maximum value of said cross-correlation data, said maximum value indicating vertical alignment between said first and second page images; and
horizontally aligning said first and second page images.

24. The computer-readable medium as recited in claim 23 wherein said horizontally aligning comprises:
selecting a printed text line of said first page image and selecting a corresponding printed text line of said second page image;
generating a first horizontal data set comprising a plurality of first horizontal values each first horizontal value based on a vertical scanline of said printed text line of said first page image and generating a second horizontal data set comprising a plurality of second horizontal values each second horizontal value based on a vertical scanline of said corresponding printed text line of said second page image;
cross-correlating said first and second horizontal data sets to generate second cross-correlation data; and
determining a maximum data of said second cross-correlation data, said maximum data indicating horizontal alignment between said first and second page images.

25. The computer-readable medium as recited in claim 24 wherein said method further comprises:
dilating one of said first and second horizontal data sets before performing said cross-correlation of said first and second horizontal data sets.

26. The computer-readable medium as recited in claim 24 wherein said first horizontal data set and said second horizontal data set are each one of a vertical projection profile and a differential vertical projection profile.

27. The computer-readable medium as recited in claim 23 wherein said first vertical data set and said second vertical data set are each one of a horizontal projection profile, a differential horizontal projection profile, and a plurality of binary values indicating whether a particular horizontal scanline represents a portion of a printed text line.

28. The computer-readable medium as recited in claim 23 wherein said dilating comprises morphologically dilating.

29. The computer-readable medium as recited in claim 23 wherein said dilating comprises convolution using a low-pass filter.

* * * * *